United States Patent [19]

Benuzzi

[11] Patent Number: 4,793,230
[45] Date of Patent: Dec. 27, 1988

[54] PRESSURE BEAM FOR SAWING MACHINES

[75] Inventor: Piergiorgio Benuzzi, Bologna, Italy
[73] Assignee: Giben Impianti S.p.A., Bologna, Italy
[21] Appl. No.: 58,013
[22] Filed: Jun. 4, 1987

[30] Foreign Application Priority Data

Jun. 11, 1986 [IT] Italy .................. 12490 A/86

[51] Int. Cl.4 ............................. B26D 7/02
[52] U.S. Cl. ........................ 83/466; 83/282; 83/360; 83/457; 83/458; 83/461
[58] Field of Search ............... 269/87.2, 93, 91, 152; 83/452, 456, 457, 458, 461, 466, 360, 465, 282, 466.1

[56] References Cited

U.S. PATENT DOCUMENTS

| 160,607 | 3/1875 | Mayer ................................ 83/452 |
| 3,083,603 | 4/1963 | Peterson ............................ 83/466 |
| 3,709,075 | 1/1973 | Goellner ............................ 83/466 |
| 3,752,023 | 8/1973 | Allison et al. ..................... 83/466 |
| 4,262,569 | 4/1981 | Yoshieda et al. .................. 83/465 |
| 4,669,348 | 6/1987 | Holder .............................. 83/452 |

Primary Examiner—Frank T. Yost
Assistant Examiner—Scott A. Smith
Attorney, Agent, or Firm—Pollock, Vande Sande & Priddy

[57] ABSTRACT

The pressure beam is adapted to be used in sawing machines for cutting workpieces such as panels or packs of panels (P), of the type comprising a workpiece support table (L) having a straight longitudinal slot defining a cutting line and a sawing tool (Z) movable along the cutting line. The pressure beam is arranged above the workpiece support table (L), extends along the whole length of the cutting line and consists of two pressure elemments (R, R') arranged at both sides of the cutting line, parallelly thereto. Each pressure element (R, R') can be raised and lowered independently of the other and laterally moved by slides to vary the distance of the pressure elements (R, R') with respect to the cutting line located between them.

6 Claims, 3 Drawing Sheets

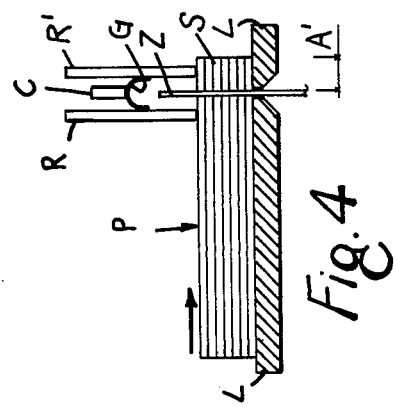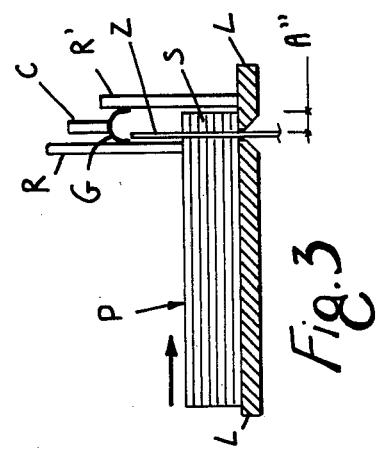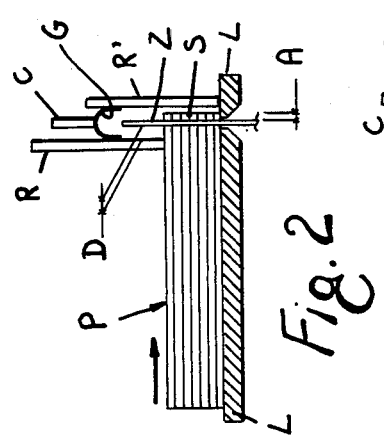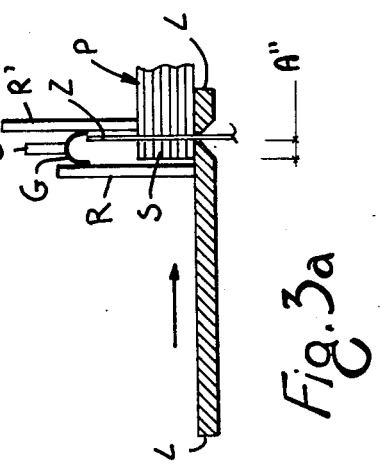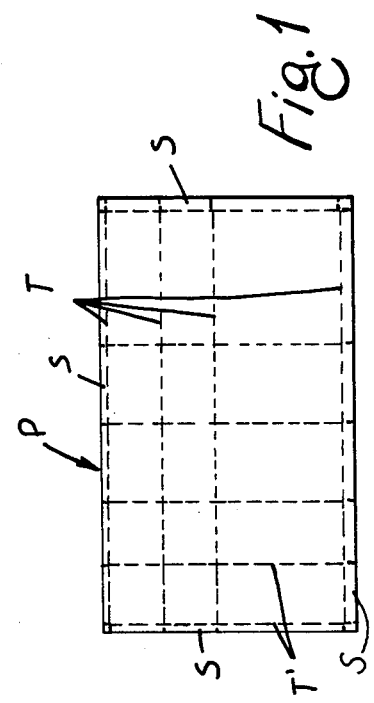

U.S. Patent  Dec. 27, 1988  Sheet 2 of 3  4,793,230
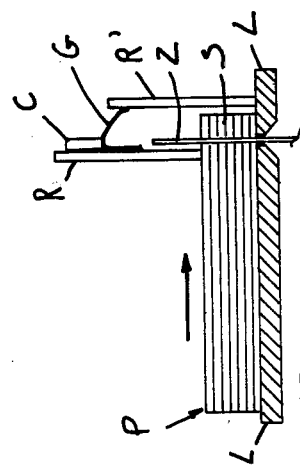
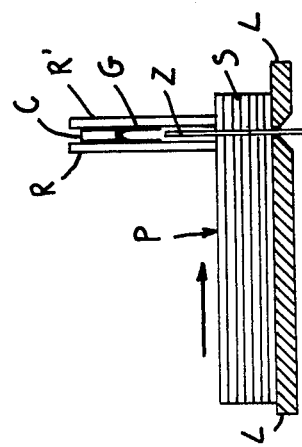
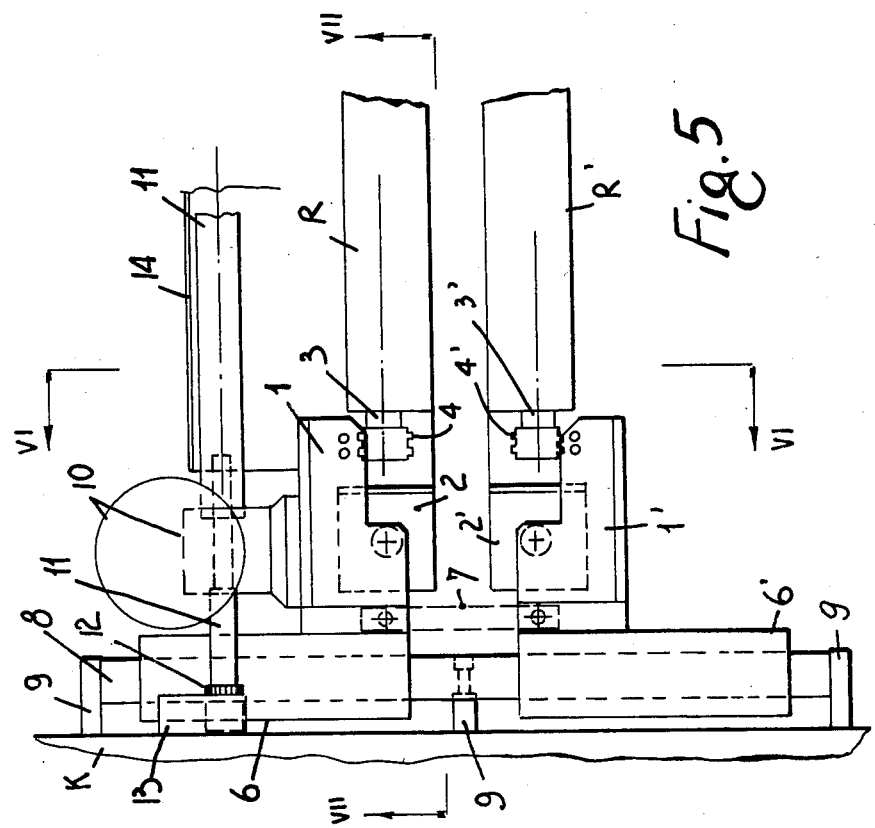

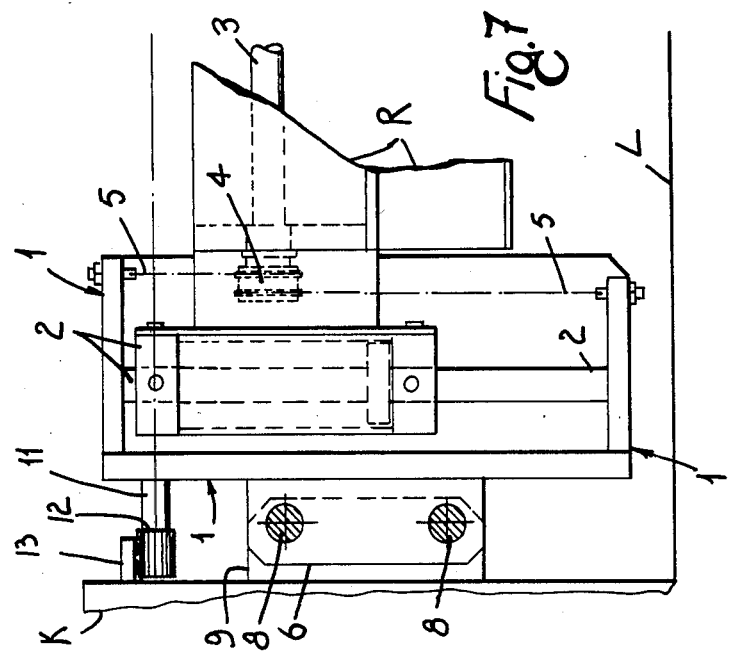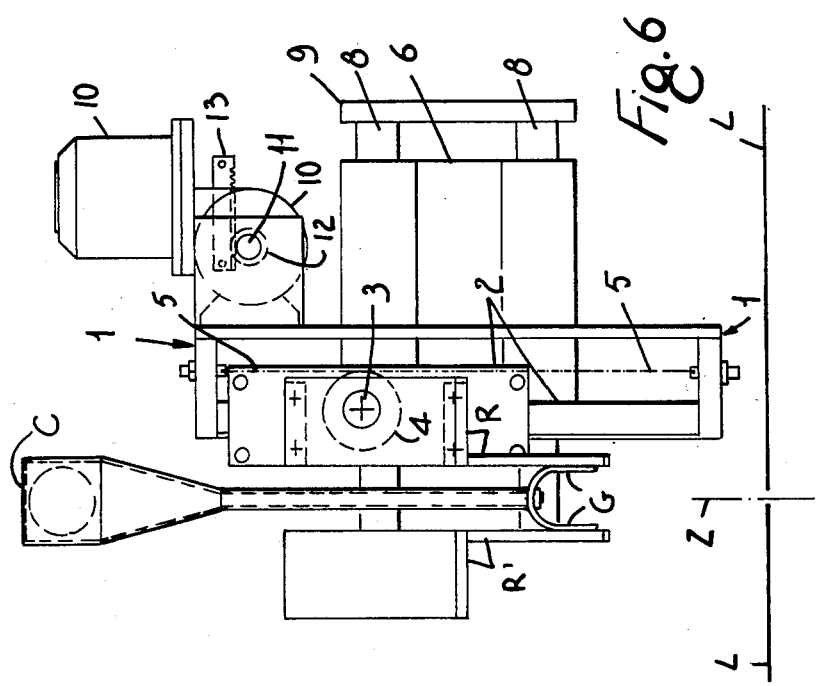

PRESSURE BEAM FOR SAWING MACHINES

BACKGROUND AND SUMMARY OF THE INVENTION

The invention relates to sawing machines and sawing plants for sectioning packs of panels of wood and/or of any like material, and more particularly relates to the double pressure beam of such machines, i.e., the member that presses a pack immediately upstream and downstream of the cutting line, parallelly thereto, in order to guarantee perfect cutting of the panels, without splinters.

The pressure beam in question is presently formed by two rectilinear parallel pressure elements, in the form of suitably shaped bars, which are associated with respective means for vertically guiding and moving them, so that the pressure beam can be adapted to different working requirements.

When changing the cutting program and/or the dimensions according to which packs of panels of a same or a different size are cut, the width or depth dimension of the leading and trailing side offcuts resulting from the perimetric trimming of said packs also changes. Such a change renders the operation of the double pressure beam problematic, since the pressure element located on the side of the offcut may operate on an offcut having a width or depth substantially equal to, or not much greater or smaller than, the distance between the inward face of the pressure element and the nearby cutting line. In this instance, anytime the pressure beam is lowered into its operative position, the pressure element comes to rub against the side of the pack, or it may bear on the offcut in such an anomalous position as to cause a defective cut by the cutting saw, or a violent drop of the pressure beam when the offcut is no more connected to the pack of panels from which it has been separated.

According to applicant's U.S. patent application Ser. No. 861,396, filed May 9, 1986, the vertical raising and lowering movement of the two pressure elements has been rendered independent, so that if the aforesaid event should occur, the pressure element which is on the side of the offcut can be kept in its lifted position. However, this solution does not solve the above disclosed problem, since, as disclosed in the aforementioned application, it is conveniently provided that when one pressure element does not contact the material in the course of being cut, it contacts the workpiece table on which the material is supported, so as to form a tunnel enclosing at its interior the path of the saw, for accident prevention reasons, and in order to make it possible to evacuate any dust resulting from the sawing operation, by means of a suction manifold operating in the longitudinal upper part of said tunnel. This arrangement is not always possible, since in some cases the width of the offcut strip is comprised within the critical limits which have been described above, i.e., is substantially equal to or not much greater or smaller than the distance between the inward face of the pressure element and the cutting line.

According to the present invention, there is provided a pressure beam in which the means for vertically guiding the pressure elements are associated with horizontal traverse means in such a manner that it is possible, when required, to cause at least the pressure element that is above the offcut of the pack of panels to change its lateral distance from the cutting line, so that it will correctly operate on the offcut, or will not interfere therewith, and will come into contact with the workpiece table of the sawing machine, thus guaranteeing in any case the closing of the aforesaid tunnel.

BRIEF DESCRIPTION OF THE DRAWINGS

Further features of the invention, and the advantages arising therefrom, will more clearly appear in the following specification of some preferred embodiments thereof, shown in the annexed sheets of drawings, in which:

FIG. 1 is a top plan view diagrammatically showing a pack of panels to be sectioned by an automatic plant of the type to which reference is made.

FIGS. 2, 3, 3a, and 4 are side views diagrammatically showing the improved double pressure beam according to the invention, in different operating conditions.

FIG. 5 is a top plan view showing the double pressure beam according to the invention.

FIGS. 6 and 7 show further constructional details of the double pressure beam, respectively taken on section lines VI—VI and VII—VII of FIG. 5.

FIGS. 8 and 9 are side views diagrammatically showing the double pressure beam according to the embodiment in which the pressure elements can be translated horizontally, independently of one another, the pressure beam being shown in different operating positions.

DESCRIPTION OF THE PREFERRED EMBODIMENT

In FIG. 1 reference P denotes a pack of panels, and references T—T' denote the longitudinal and transverse cuts to which the pack is subjected for obtaining pack fractions of the desired dimensions. Reference S denotes the perimetric offcut portions of the pack, which have a depth or width dimension that changes according to the cutting program to be carried out, and as a function of the size of the different portions into which the pack P is to be sectioned. A pack of panels P is blocked on the workpiece table of the sawing machine by a bilateral pressure beam acting upon the pack immediately upstream and downstream of the cutting line, parallelly thereto, and at a proper symmetrical distance therefrom. This distance presently is a fixed distance. In the double pressure beams of a technically advanced type, each pressure element is controlled by respective means for vertically guiding it, and is driven by respective driving means, so that these elements can be independently moved vertically, performing runs of different length. When making the trimming cuts leading to the formation of the said offcuts S, such a condition makes it possible to set both components of the double pressure beam in contact with the pack of panels, or to set one of them in contact with the pack, and the other one, which is on the side of the offcut, in contact with the table of the sawing machine. In any case, the pressure elements enclose the cutting line of the sawing machine, whereby any accident is prevented, and the removal of any dust resulting from the sawing operation, by means of a suction manifold operating between the said pressure elements, is guaranteed.

Owing to the different depth or width dimension of the offcuts S, and when an offcut is of such a size that it is equal to, or not much greater or smaller than, the distance between the inward face of each pressure element and the nearby cutting line, the pressure element which is on the side of the offcut may rub against the end side of the pack, or it may bear on the offcut in an offset position, with the possibility that the cutting saw may be jammed, and then make a defective cut, and/or with the possibility that this pressure element may violently drop down on the workpiece table when the offcut has been detached and is loose.

The invention intends to obviate to these and other drawbacks by adapting the following solution. It should be noted at the outset that, with cutting machines and cutting plants, a small computer is presently used, to which are fed the data of the cutting program and of the dimensions according to which a pack of panels must be cut, the computer automatically controlling the whole operation of the plant. By means of this computer, it is possible to know when in the operative cycle of the plant an offcut is of such a size as to give rise to the aforementioned drawbacks. For this purpose, other means may be used as an alternative to, or in combination with, the computer, such as, for example, sensors of any suitable type and number, located upstream and downstream of the cutting line, on the side of the fixed aligning device against which the pack of panels to be cut constantly and uniformly bears with one of its sides.

FIG. 2 shows that the pressure elements R and R' of the pressure beam are normally positioned at a predetermined same distance D from the cutting line (disk saw Z). When the offcut S has a depth or width A which is sufficiently smaller than D, just as in the example shown in FIG. 2, the pressure elements R and R' are kept in the position in which they are located with respect to Z, so that when they are driven down into their active operative position, the element R contacts the pack P, and the element R', which is on the side of the offcut S, contacts the workpiece table L of the sawing machine. When, as indicated in FIG. 4, the offcut S has a width A' which greatly exceeds the said distance D, the elements R and R' are also kept in their normal position with respect to Z, and when they are lowered, they both contact the pack of panels P. When the width A" of the offcut S is substantially equal to, or is not much different from D, as in the example shown in FIG. 3, at least the pressure element which is on the side of the offcut is moved away from the cutting line Z and is positioned at a distance therefrom having a predetermined value, greater than the said value A", so that the said pressure element contacts the workpiece table L of the sawing machine without any possibility of interfering with the offcut S. When making the leading side offcut, it is the pressure element R' which is moved away from Z, as shown in FIG. 3, while when making the trailing side offcut, as shown in FIG. 3a, it is the pressure element R that is moved away from Z.

From FIGS. 3 and 3a and from the comparison of these Figures with FIGS. 2 and 4, it appears that the above stated purpose can be attained by keeping fixed the distance between the pressure elements R and R', and by associating the said elements with a same single unit for horizontally translating them, which is capable of shifting the double pressure beam in both directions (FIGS. 3 and 3a), and which is capable of returning the said pressure beam to its normal rest position, with its pressure elements R and R' at a same distance from Z (FIGS. 2 and 4).

With reference to FIGS. 5, 6, and 7, a description follows of an embodiment of the traverse means for laterally moving the pressure elements R and R' in order to achieve the positions shown in FIGS. 2 to 4. A vertical structure 1 supports the opposite ends of the stem of a double-acting piston and cylinder unit 2, its body being secured to one end of one of the pressure elements of the other end of said element similar the other end of said element there are provided similar means are provided. Similar means designated by the addition of the mark "prime" to the numerals are provided for the other pressure element of the double pressure beam.

A shaft 3 is longitudinally and rotatably mounted in the body of each pressure element, and carries at each end a member 4 consisting, for example, of a gearwheel, or a pinion, or a capstan barrel, and respectively cooperating with rack or chain or rope means diagrammatically designated by 5, which are supported by the structure 1, and through which the movement of the piston and cylinder units 2 is synchronized, so that the pressure element always moves parallelly to itself and to the workpiece table L of the sawing machine.

According to the invention, the structures 1, 1' at the ends of the pressure elements R, R' are secured to slides 6, 6' (only one of which is visible in FIG. 6), which are interconnected by a connecting bar 7, and which slide on a horizontal rectilinear guide 8 arranged at right angles to the said elements R, R', and secured to the base frame K of the machine with the interposition of intermediate and end supports 9. To one of the structures 1 or 1' there is secured a geared motor unit 10 which can rotate in both directions, and which has its slow shaft arranged parallel to the elements R, R', and which by this shaft is keyed to a shaft 11 lying parallel to R, R', so as to rotatably support at one end the said shaft 11, which by its other end is in turn rotatably supported by the other structure 1 of pressure element R. Keyed onto both ends of shaft 11 are identical pinions 12 in mesh with racks 13 secured to the frame K, parallelly to the slides 6, 6'. A casing 14 screens the shaft 11 for preventing accidents, and is, for example, supported by the structures 1, 1'.

As a result of the activation of motor unit 10 in one or the other direction, the pressure elements R, R' as a single unit can be translated horizontally and can be moved into the positions shown in FIGS. 3 and 3a, and can then be returned to their rest positions, shown in FIGS. 2 and 4. The geared motor unit 10 is controlled by the computer on board of the sawing plant and/or by the aforementioned sensors, in a manner which is easily conceivable by those skilled in the art.

The horizontal translation movements of the double pressure beam are effected when the said pressure beam is in its lifted, rest position, and preferably during downtime of the sawing plant.

The suction manifold C can be fixed by its ends to the connecting bars 7 (FIG. 5) so as to be moved along with the slides 6, 6', or else it may be fixed differently to the frame K, since the elasticity of the material forming the seal G will guarantee the tightness of the seal with respect to the inward sides of the pressure elements R, R'.

From FIG. 5 it appears evident that by removing the connecting bar 7 between the slides 6, 6' and by providing the structure 1' with a geared motor unit like the unit 10 together with the transmission drive 11, 12, it is possible to realize independent horizontal translation of the pressure elements R, R'.

Referring to FIG. 8, the pressure elements R, R' can normally be positioned very close to the cutting line Z since, due to the just mentioned modification, these elements can be selectively moved away from Z any time the size of the offcut S is very small, as in the example shown in FIG. 9. In contrast to the preceding embodiment, when one pressure element is moved away from the saw Z, the other element is kept stationary. The weight of the moving elements is therefore reduced, with consequent constructional and functional simplifications. In this instance, the suction manifold C is fixed to the frame K, and it is the flexibility of the wings of the seal G that guarantees the permanent and uniform contact of these wings with the inward sides of the pressure elements R, R', whose distance from each other can now be modified.

It will be understood that the specification refers to some preferred embodiments of the invention, in which the constructional details relating to the electric or electronic circuits, the fluid pressure circuits, and the several safety devices have been omitted, since they are all easily conceivable by those skilled in the art.

I claim:

1. A pressure beam adapted to be used in sawing machines for cutting panels or packs of panels (P), of the type comprising a panel support table (L) having a straight longitudinal slot defining a cutting line and a sawing tool (Z) movable along said cutting line, said pressure beam being arranged above said workpiece support table (L), extending along the entire length of the cutting line and consisting of first and second pressure elements (R, R') arranged at both sides of said cutting line, parallelly thereto, means being provided for raising and lowering each pressure element (R, R') independently with respect to the other pressure element, and further comprising traverse means for laterally moving said pressure elements (R, R') to vary the distance of said pressure elements (R, R') with respect to said cutting line located between them in order to avoid interference between said pressure elements and leading and trailing edges of said packs of panels.

2. A pressure beam according to claim 1, wherein said traverse means comprise for each pressure element (R, R') a pair of slides (6, 6') arranged at both ends of said pressure element so as to support said pressure element, each slide being movable on horizontal fixed guides (8) extending perpendicularly to said pressure element, driving means (10, 11, 12, 13) being provided for causing horizontal lateral displacement of said slides (6, 6') on said fixed guides (8).

3. A pressure beam according to claim 2, wherein said driving means comprise a motor unit (10) driving a shaft (11) extending along the entire length of said pressure element and provided at ends of said motor unit with pinions (12) which engage fixed racks (13).

4. A pressure beam according to claim 1, wherein the two pressure elements (R, R') are kinematically connected to each other for lateral movement, and the traverse means comprise driving means (10, 11, 12, 13) acting on only one of said pressure elements, whereby lateral movement of one pressure element, caused by said driving mans, will automatically cause corresponding lateral movement of the other pressure element.

5. A pressure beam according to claim 4, wherein each pressure element (R, R') is mounted on horizontally displaceable supporting members (6, 6'), the supporting members (6) of one pressure element (R) being connected to the supporting members (6') of the other pressure member (R') by connecting means (7).

6. A pressure beam according to claim 1, wherein the two pressure element (R, R') are independent of each other as regards lateral movement.

* * * * *